(12) United States Patent
Sugai et al.

(10) Patent No.: US 7,093,373 B2
(45) Date of Patent: Aug. 22, 2006

(54) DISPLACEMENT MEASURING INSTRUMENT

(75) Inventors: Chikara Sugai, Nakatsugawa (JP); Toshiyuki Shinohara, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/799,561

(22) Filed: Mar. 11, 2004

(65) Prior Publication Data

US 2004/0181960 A1 Sep. 23, 2004

(30) Foreign Application Priority Data

Mar. 20, 2003 (JP) .............................. 2003-078587

(51) Int. Cl.
*G01B 3/18* (2006.01)
*G01B 5/02* (2006.01)
(52) U.S. Cl. .............................. 33/792; 33/832; 33/783
(58) Field of Classification Search .......... 33/792–794, 33/783–784, 797, 832
See application file for complete search history.

(56) References Cited

U.S. PATENT DOCUMENTS

| | | | | | |
|---|---|---|---|---|---|
| 2,771,682 | A | * | 11/1956 | Dorr | .......................... 33/794 |
| 3,403,446 | A | * | 10/1968 | Trnka | .......................... 33/804 |
| 4,977,682 | A | * | 12/1990 | Allen, III | ...................... 33/550 |
| 5,335,424 | A | * | 8/1994 | Spangler | ....................... 33/834 |
| 5,421,101 | A | * | 6/1995 | Rank | ........................... 33/831 |
| 5,440,819 | A | * | 8/1995 | Marsh et al. | .............. 33/501.6 |
| 5,450,909 | A | * | 9/1995 | Stevenson | ..................... 33/285 |
| 6,187,242 | B1 | * | 2/2001 | Onoda | ......................... 264/255 |
| 6,609,306 | B1 | * | 8/2003 | Johnson et al. | ............... 33/265 |

FOREIGN PATENT DOCUMENTS

| | | |
|---|---|---|
| FR | 2 257 074 | 8/1975 |
| JP | 04108162 | 4/1992 |
| JP | 3065835 | 11/1999 |
| JP | 2001021302 | 1/2001 |

* cited by examiner

*Primary Examiner*—Yaritza Guadalupe-McCall
(74) *Attorney, Agent, or Firm*—Rankin, Hill, Porter & Clark LLP (57) ABSTRACT

A displacement measuring instrument (1) has a spindle (25) penetrating a gauge body (11) to be slidably supported relative to the gauge body (11) to be displaced and a lifting lever (20) manipulated from the outside for forcibly shifting the spindle. A lever support (30) supporting an end opposite to a drive end (20A) of the lifting lever (20) that is in contact with the spindle (25) is supported by engaging a dovetail groove thereon with a projection of an engaging member (35) formed on the outer circumference of the gauge body (11).

4 Claims, 7 Drawing Sheets

RELATED ART

FIG.7

RELATED ART

DISPLACEMENT MEASURING INSTRUMENT

BACKGROUND OF THE INVENTION

1. Field of the Invention

The present invention relates to a displacement measuring instrument, which specifically relates to a displacement measuring instrument having a spindle capable of being manually operated by a lifting lever.

2. Description of Related Art

Conventionally, dial gauges for measuring a thickness of a workpiece by a spindle being manually operated by a lifting lever to measure the displacement thereof have been known (see Japanese Utility Model Publication of Registration No. 3065835, for instance).

Figure 6:
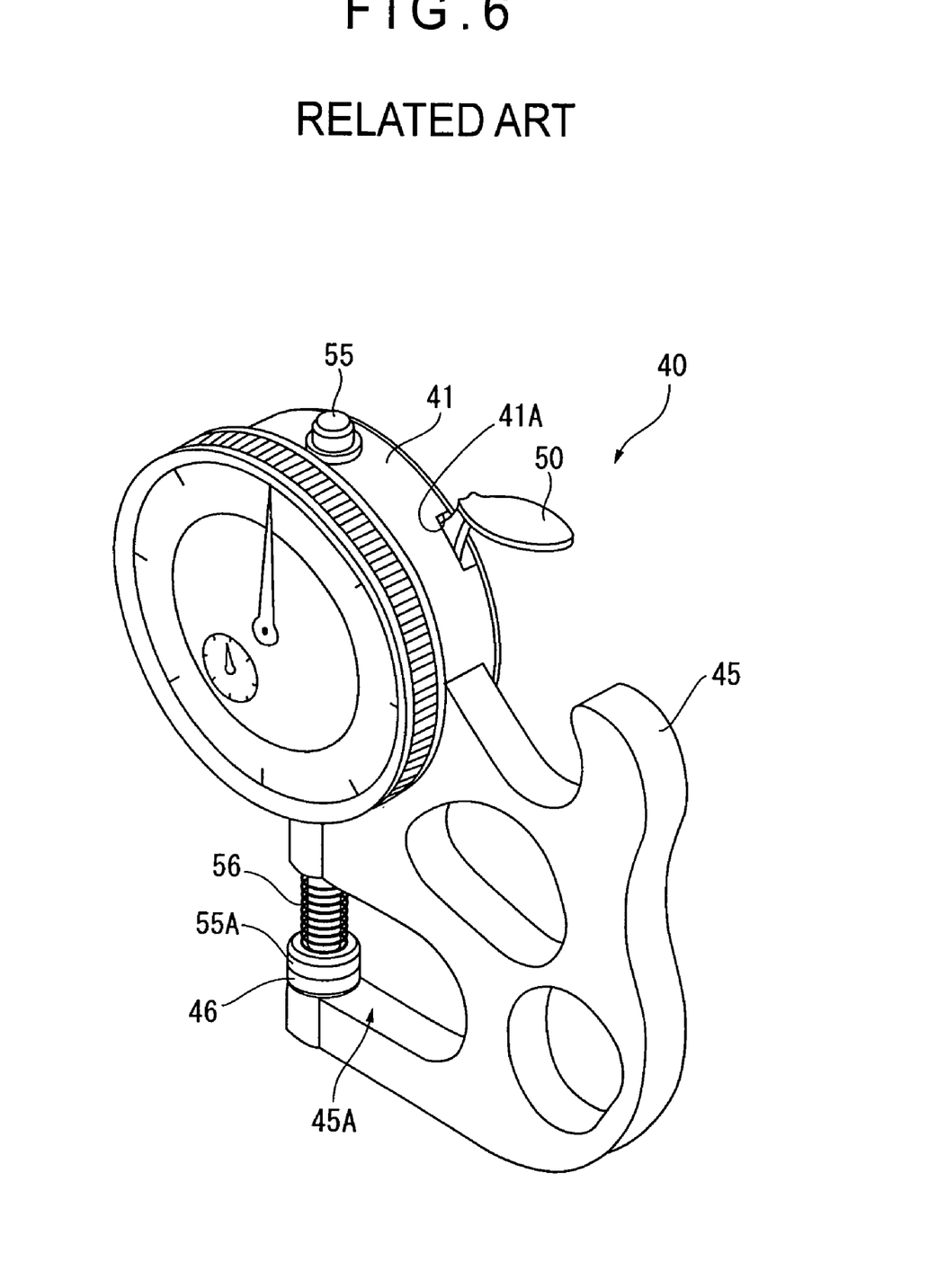
FIG. 6 is an illustration showing a related art.

As shown in FIG. 6, a dial gauge 40 of the above publication has an upper holder 55A provided on a slidable measurement rod 55 penetrating a center of a display 41. On the other hand, a grip 45 is attached to a side of the display 41 and a lower holder 46 is provided on a holding groove 45A of the grip 45, the lower holder 46 and the upper holder 55A sandwiching a workpiece to measure the thickness of the workpiece.

An end of the measurement rod 55 is in the holding groove 45A and an elastic member 56 is provided between the upper holder 55A and the grip 45 on an end of the measurement rod 55.

A pressing member 50 extending from the display 41 is provided on a side of the display. A part of the pressing member 50 extends from a predetermined opening 41A formed on the side of the display 41 toward the inside of the display to be connected with the measurement rod 55, so that, when the pressing member 50 is pressed, the measurement rod 55 is slid in a direction for the upper holder 55A to move away from the lower holder 46 and, when the pressing member 50 is released, the measurement rod 55 returns to the rest position thereof by the elastic member 56, to press the upper holder 55A onto the surface of the lower holder 46.

In the thickness-measuring dial gauge 40 of the above publication, in order for the pressing member 50 to extend from the side of the display 41 with a part thereof being extended and inserted to the inside of the display 41 and to turn the pressing member 50 within a predetermined range, the opening 41A formed on the side of the display 41 is elongated.

Accordingly, minute dusts and the like enter from the opening 41A into the inside of the display 41, which may undesirably affect on precise measurement. The above problem is caused because the pressing member 50 and the measurement rod 55 are connected inside the display 41.

Figure 7:
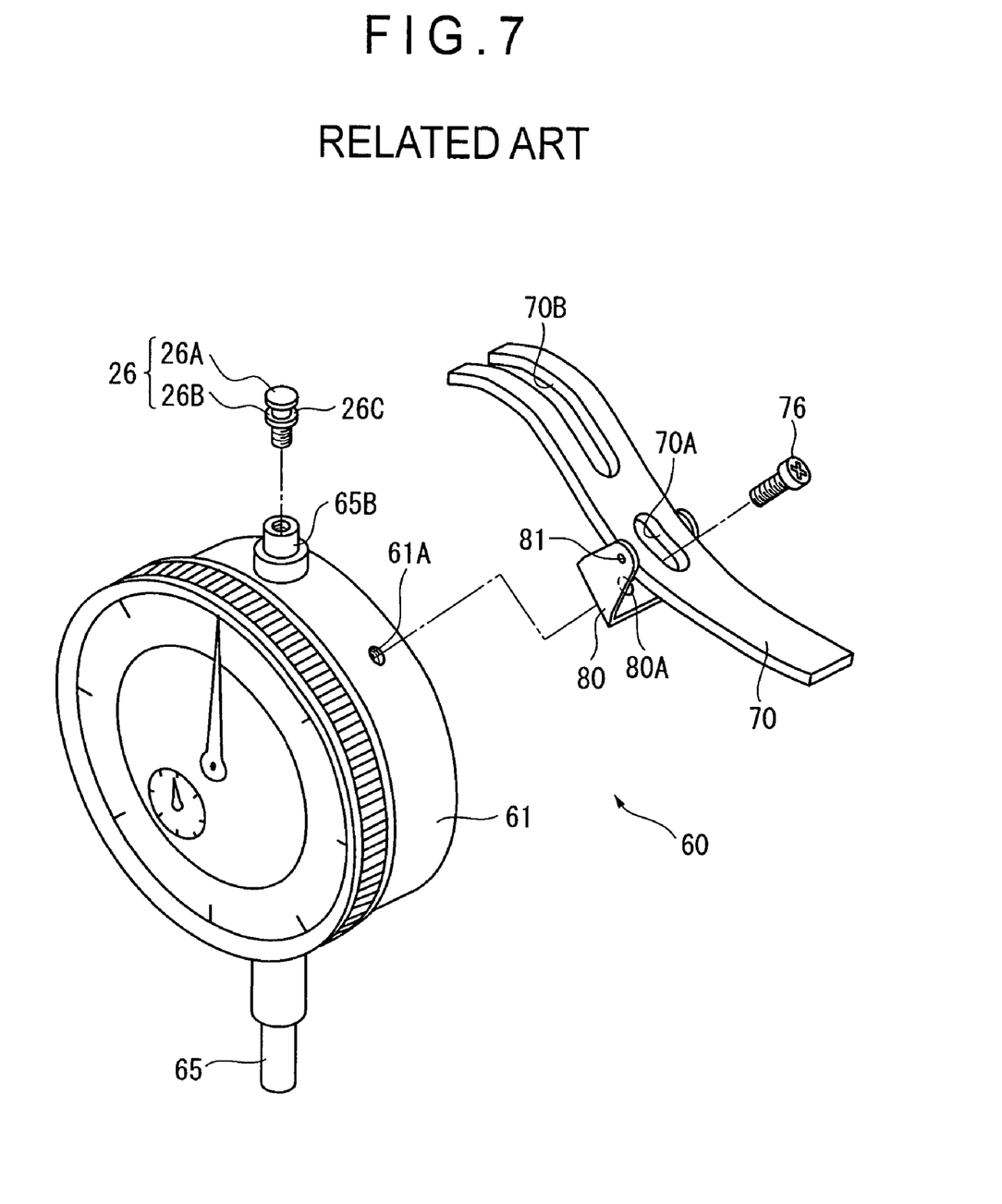
FIG. 7 is an illustration showing another related art.

In order to overcome the above problem, another structure such as a dial gauge 60 shown in FIG. 7 may be proposed. In the dial gauge 60, a measurement rod (spindle) 65 and a pressing member (lifting lever) 70 are connected on the outside of a display (gauge body) 61.

Specifically, a penetrating tap 61A is drilled on a side of the gauge body 61. On the other hand, the lifting lever 70 is swingably supported by a lever support 80 around a pivot axis 81. An attachment hole 70A is formed around the pivot axis 81 of the lifting lever 70 and a penetrating hole 80A corresponding to the attachment hole 70A is formed on the bottom side of the lever support 80. The lever support 80 is attached to the gauge body 61 by inserting a screw 76 from the attachment hole 70A of the lifting lever 70 into the penetrating hole 80A of the lever support 80 and screwing the screw 76 to the penetrating tap 61A of the gauge body 61.

An elongated groove 70B having an open end is formed on an end of the lifting lever 70. A stopper screw 26 having a head 26A and a rib 26B is attached to a manipulation end 65B of the spindle 65. A circular groove 26C is formed between the head 26A and the rib 26B.

The lifting lever 70 and the spindle 65 are engaged by inserting the elongated groove 70B of the lifting lever 70 into the circular groove 26C of the stopper screw 26 attached to the manipulation end 65B of the spindle 65.

However, when the lifting lever 70 is attached through the penetrating tap 61A drilled on a side of the gauge body 61, minute dust may invade therein before screwing the screw 76 into the penetrating tap 61A or cut powders remaining in the penetrating tap 61A and minute dusts etc. generated when the screw 76 is screwed to the penetrating tap 61A may invade in screwing the screw 76, which may cause trouble in precisely measuring a workpiece. Further, a tool and a lot of work are necessary for fixing the lifting lever 70.

SUMMARY OF THE INVENTION

An object of the present invention is to provide a displacement measuring instrument capable of improving dust-proofness and easily attaching a lifting lever without a tool.

A displacement measuring instrument according to an aspect of the present invention has: an instrument body; a spindle penetrating the instrument body to be slidably supported by the instrument body to be displaced; a lifting lever manipulated from the outside to forcibly shifting the spindle; a lever support that supports an end of the lifting lever opposite to a drive end of the lifting lever that is in contact with the spindle; and an engaging member provided on an outer circumference of the instrument body that engages and supports the lever support.

According to the above arrangement, the lifting lever is supported by the lever support and the lever support is engaged and supported by the engaging member provided on the outer circumference of the instrument body. Accordingly, no tap and the like is necessary on the instrument body for directly attaching the lifting lever on the instrument body by a screw or the like, so that the invasion of minute dusts into the instrument body can be prevented, thereby improving dust-proofness.

Further, since the lever support can be attached to the engaging member only by engaging the lever support with the engaging member, the lifting lever can be easily attached without a tool.

In the above arrangement, the lever support and the engaging member may be engaged in any manner. For instance, the bottom section of the lever support may be formed to have a C-shaped cross section to cover the upper side and upper lateral sides of the engaging member, where a conic notch is formed on one of the upper lateral sides of the engaging member or the bottom section opposite to the upper lateral side and a projectable and retractable sphere is formed on the other to be engaged with the notch, the sphere and the notch engaging the lever support and the engaging member.

Alternatively, a groove parallel to the upper side of the engaging member may be formed on both sides of an engaging member of a rectangular cross section and an attachment made of a plate spring having a hook may be formed on the bottom side of the lever support where the hook is engaged with the groove to engage the lever support.

In the above aspect of the present invention, the lever support and the engaging member may preferably be engaged by a dovetail arrangement including a groove formed on one of the lever support and the engaging member along the outer circumference of the measuring instrument body and a projection formed on the other of the lever support and the engaging member to be engaged with the groove.

According to the above arrangement, since the lever support supporting the lifting lever is engaged with the engaging member by fitting the groove to the projection or fitting the projection to the groove, the lifting lever can be easily attached with one-touch action without a tool.

In the above aspect of the present invention, a detachment stopper that prevents the lever support from being detached from the engaging member when the lever support is engaged with the engaging member and is slid by a predetermined distance may preferably be provided on the engaging member.

According to the above arrangement, when the lever support is engaged with the engaging member, since the lever support is not detached from the engaging member by the detachment stopper, the measurement can be securely conducted.

In the above aspect of the present invention, the lever support may preferably be a synthetic resin molding.

According to the above arrangement, since a large number of the same lever supports can be easily manufactured with a desired shape, mass-production of the displacement measuring instrument can be easily achieved.

DETAILED DESCRIPTION OF PREFERRED EMBODIMENT(S)

An embodiment of the present invention will be described below with reference to attached drawings.

Figure 1:
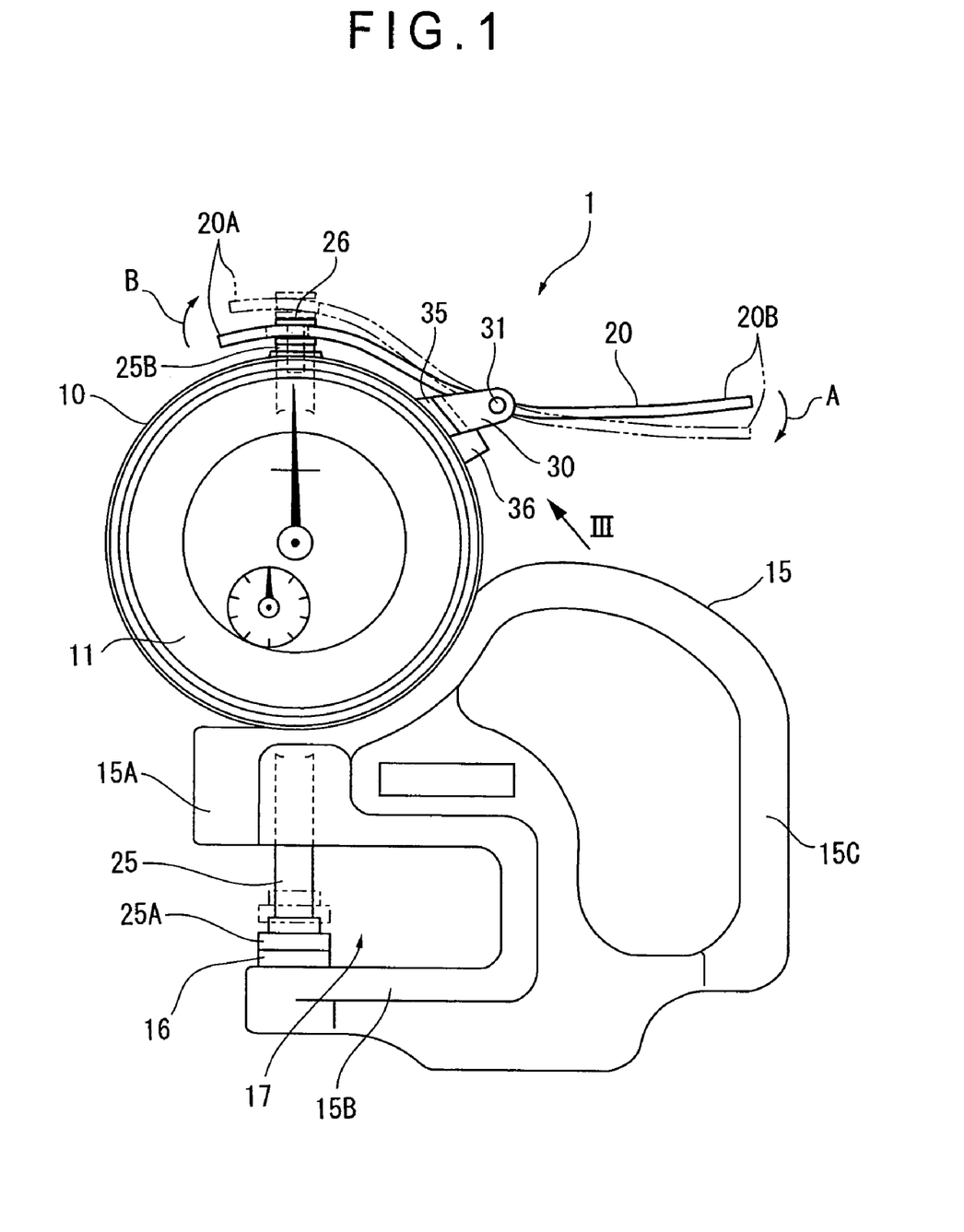
FIG. 1 is an entire illustration showing a displacement measuring instrument according to an embodiment of the present invention.
Figure 2:
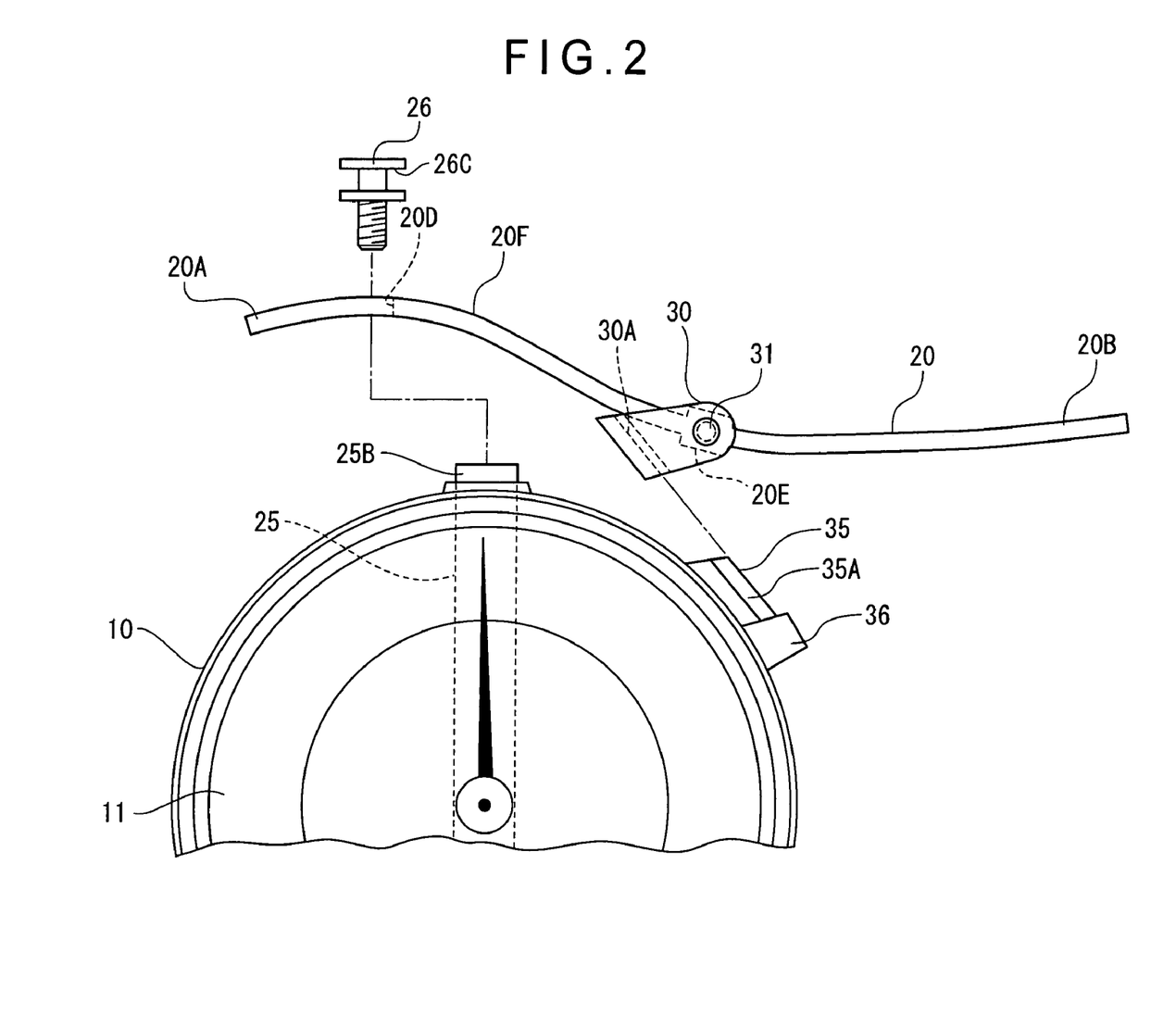
FIG. 2 is a detailed illustration showing a primary portion of the aforesaid embodiment.

FIGS. 1 and 2 show an embodiment of a displacement measuring instrument according to an aspect of the present invention.

A displacement measuring instrument 1 of the present embodiment has a dial gauge 10, a holder frame 15 for holding the dial gauge 10 and a manually operable lifting lever 20, where a spindle 25 is forcibly shifted by the lifting lever 20.

The dial gauge 10 is fixed approximately at the top of the holder frame 15, the holder frame 15 having an upper jaw 15A formed under the dial gauge 10, a lower jaw 15B opposing to the upper jaw 15A to form a measurement space 17, and a grip 15C that is gripped by inserting hand fingers. An anvil 16 on which a workpiece such as a resin sheet to be measured is mounted is provided on the lower jaw 15B.

The dial gauge 10 has a gauge body 11 (measuring instrument body) on which numerals indicating measurement values are formed. The spindle 25 penetrates the gauge body 11 to be slidable in the longitudinal direction thereof. The spindle 25 has a measurement end 25A that extends toward near the lower jaw 15B in the measurement space 17, the measurement end 25A capable of being pressed onto the surface of the anvil 16.

A drive end 20A of the lifting lever 20 is engaged with a manipulation end 25B opposite to the measurement end 25A of the spindle 25.

In other words, as shown in FIG. 2, the lifting lever 20 has the drive end 20A and a manual end 20B opposite thereto. The lifting lever 20 and the spindle 25 are interlocked by screwing a stopper screw 26 to the manipulation end 25B of the spindle 25 and inserting an elongated groove 20D of the lifting lever 20 to a circular groove 26C of the stopper screw 26.

Incidentally, the elongated groove 20D of the lifting lever 20 has approximately the same shape as the elongated groove 70B of the lifting lever 70.

Approximately the middle section between the drive end 20A and the manual end 20B of the lifting lever 20 is swingably supported by the lever support 30 and an engaging member 35.

The lever support 30 is made of, for instance, a synthetic resin molding. On the upper side (in FIG. 2) of the lever support 30, a pivot axis 31 penetrating a thick engaging portion 20E formed approximately at the center of the lifting lever 20 is provided, the lifting lever 20 being swingable around the pivot axis 31.

An upper side 20F of the lifting lever 20 including the drive end 20A is formed in an involute curve with the center of curvature thereof located under the drive end 20A so that the upper side 20F is constantly in contact with the manipulation end 25B of the spindle 25 at any slide angle of the drive end 20A around the pivot axis 31 seen from lateral side (in a direction orthogonal to the sheet surface of FIG. 2). Alternatively, the drive end 20A of the lifting lever 20 may be formed in an approximate involute curve near the surface in contact with the stopper screw 26.

Figure 3:
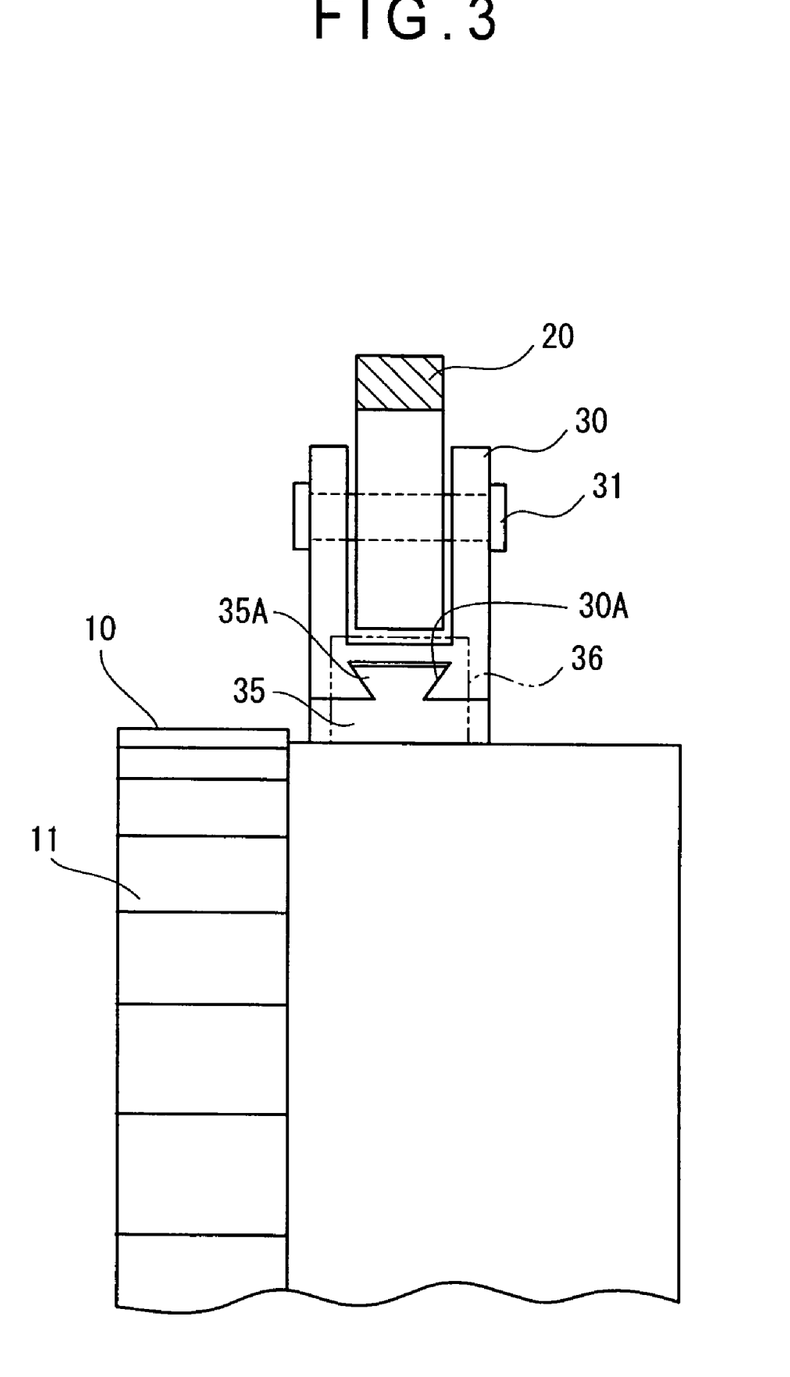
FIG. 3 is an end view seen from the direction of III in FIG. 1.

As shown in FIGS. 2 and 3, a trapezoidal dovetail groove 30A (seen from front side) extending in a direction along the outer circumference of the gauge body 11 is formed on the bottom side of the lever support 30.

As described above, the lever support 30 is fixed to the engaging member 35. The engaging member 35 is provided on the outer circumference of the gauge body 11 and has a projection 35A extending along the outer circumference for a predetermined length to be engaged with the dovetail groove 30A. The projection 35A has a trapezoidal cross section. The engaging member 35 is integrated with the gauge body 11 by, for instance, die-casting. Alternatively, the engaging member 35 may be formed independent of the gauge body 11 and fixed on the gauge body 11 by welding etc.

In order to engage the lever support 30 with the engaging member 35, the dovetail groove 30A of the lever support 30 is inserted to the projection 35A of the engaging member 35 and is slid by the length of the projection 35A.

A detachment stopper 36 for preventing the lever support 30 from being detached from the engaging member 35 when the lever support 30 is engaged with the engaging member 35 is provided on an end of the engaging member 35 on the side of the manual end 20B of the lifting lever 20. The detachment stopper 36 is a block-shaped component, which is integrated with the engaging member 35. The detachment stopper 36 not only prevents the detachment of the lever support 30 from the engaging member 35 but also prevents the shift of the pivot axis 31, which changes the contact condition between the lifting lever 20 and the stopper screw 26 to reduce the effect for smooth movement by the involute curve on the upper side of the lifting lever 20.

Since the lifting lever 20, the lever support 30 and the engaging member 35 are arranged as in the above, when the manual end 20B of the lifting lever 20 is pushed in the arrow A (downward) as shown in FIG. 1 while the drive end 20A of the lifting lever 20 is engaged with the operation end 25B of the spindle 25 and the middle section of the lifting lever 20 is supported by the lever support 30 with the lever support 30 being attached to the engaging member 35.

Next, how the above displacement measuring instrument 1 is used will be described below.

Initially, whether the measurement end 25A of the spindle 25 is pressed to the surface of the anvil 16 or not, i.e. whether zero dimension is displayed or not is checked.

Next, the grip 15B of the holder frame 15 is grasped and the manual end 20B of the lifting lever 20 is pressed in the direction of the arrow A. Then, the drive end 20A of the lifting lever 20 is swung in a direction of arrow B and the spindle 25 engaged with the lifting lever 20 is lifted in accordance therewith.

Consequently, a gap is formed between the measurement end 25A of the spindle 25 and the surface of the anvil 16 and a workpiece such as a resin sheet is put on the surface of the anvil 16 inside the measurement space 17 to measure the workpiece. In measuring the workpiece, the manual end 20B of the lifting lever 20 is pressed in a direction opposite to the arrow A, so that the spindle 25 is moved toward the anvil 16 and the measurement end 25A of the spindle 25 is pressed onto the surface of the anvil 16 sandwiching the workpiece according to the operation reverse to the above. The thickness of the workpiece is measured by reading the dimension at the time.

According to the above displacement measuring instrument 1, following advantages can be obtained.

(1) The lifting lever 20 is supported by the lever support 30 and the lever support 30 is engaged with and supported by the engaging member 35 provided on the outer circumference of the gauge body 11. Accordingly, since the lifting lever 20 is directly attached to the gauge body 11 by a screw etc., no tap is required on the gauge body 11, so that minute dusts and the like do not invade into the gauge body 11 through the tapped hole, thereby improving dust-proofness.

(2) Since the lever support 30 and the engaging member 35 are engaged by a dovetail structure of the dovetail groove 30A formed around the outer circumference of the gauge body 11 on the lever support 30 and a projection 35A formed on the engaging member 35 to be engaged with the dovetail groove 30A, the lifting lever 20 can be easily attached by fitting the projection 35A to the dovetail groove 30A, so that the lifting lever 20 can be attached to the gauge body 11 by one-touch action without a tool.

(3) Since the detachment stopper 36 is provided on an end of the engaging member 35 so that the lever support 30 is not detached when the dovetail groove 30A of the lever support 30 is fitted to and slid on the projection 35A of the engaging member 35 by the detachment stopper 36, the measurement can be securely conducted and, since the pivot axis 31 is not shifted, the lifting lever 20 and the stopper screw 26 are in contact with each other at a stable condition. Accordingly, the effect of the involute curve on the upper surface of the lifting lever 20, in other words, smooth movement can be attained.

(4) Since the lever support 30 is a synthetic resin molding, the lever support 30 can be formed in any desired shape and a large number of the same products can be easily produced, thus allowing mass-production of the displacement measuring instruments as required.

(5) Since the upper side 20F of the lifting lever 20 including the drive end 20A has an involute curve configuration having the curvature center thereof under the drive end 20A so that the upper side 20F is constantly in contact with the manipulation end 25B of the spindle 25 around the pivot axis 31 by a desired slide angle on the drive end 20A, when the manual end 20B of the lifting lever 20 is pushed down or up, the operation end 25B of the spindle 25 is smoothly interlocked with the drive end 20A of the lifting lever 20, thus improving the operability thereof.

Incidentally, the displacement measuring instrument 1 of the present invention may be arranged not only as described above but also may be designed in different manner as long as an object of the present invention can be attained.

Figure 4:
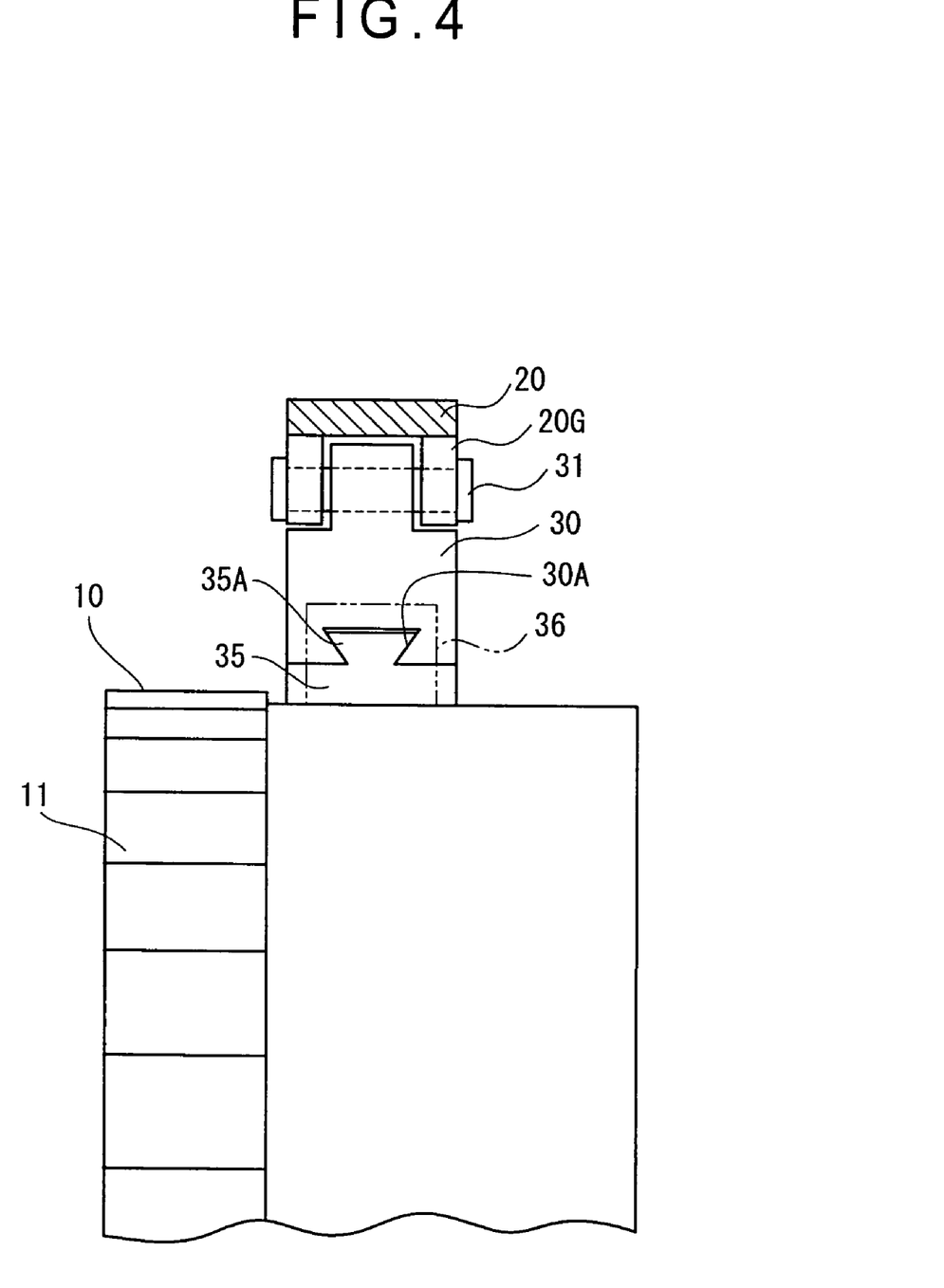
FIG. 4 is an illustration showing a modification of the aforesaid embodiment.

For instance, though the lifting lever 20 is attached to the lever support 30 by penetrating the pivot axis 31 to the thick engaging portion 20E of the lifting lever 20, the lifting lever 20 may be attached as shown in FIG. 4. Specifically, the section of the lifting lever 20 corresponding to the lever support 30 may be arranged as an engaging portion 20G having C-shaped cross section and the lever support 30 may be covered with the engaging portion 20G, so that the engaging portion 20G is connected with the lever support 30 by the pivot axis 31.

Figure 5:
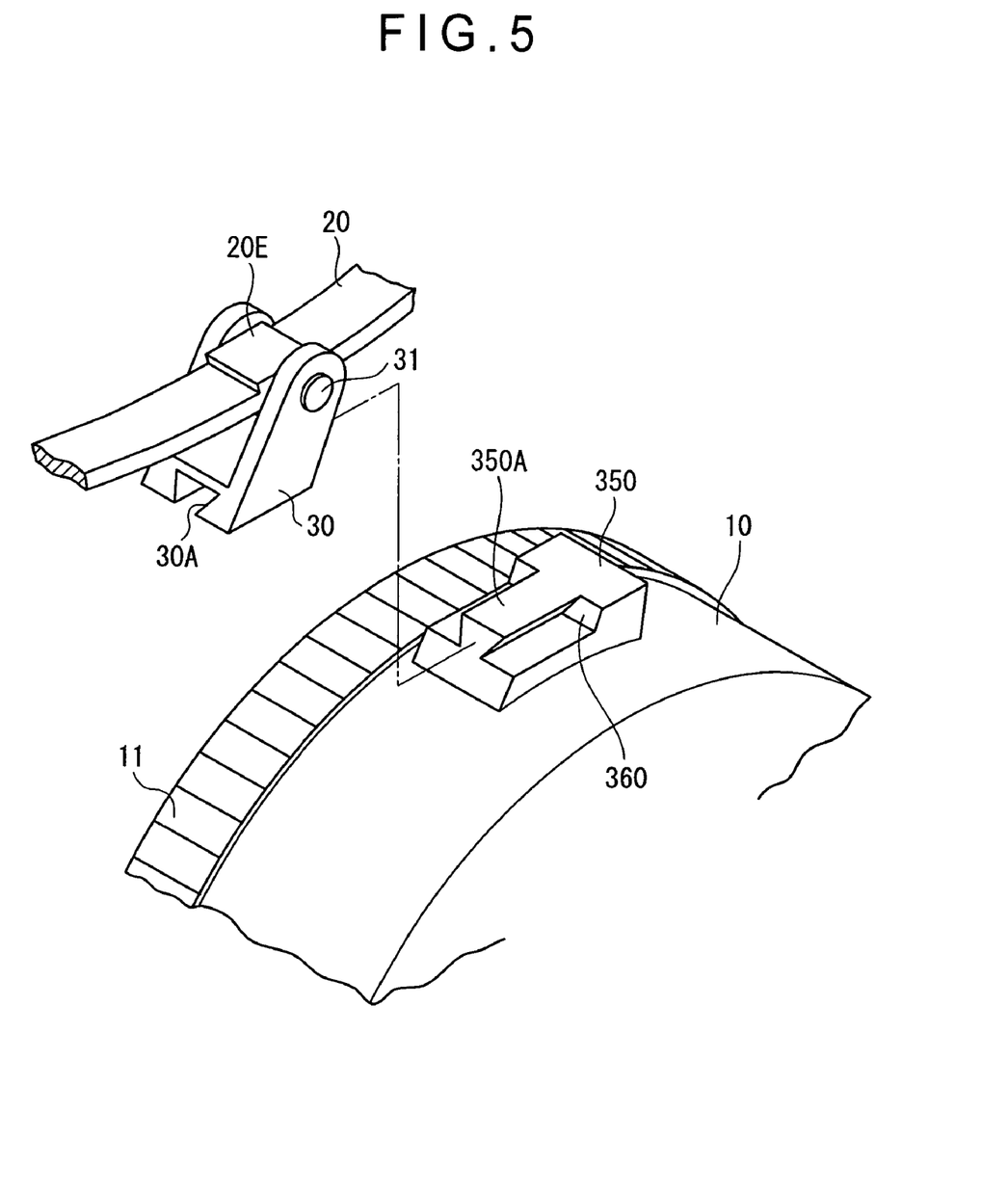
FIG. 5 is an illustration showing another modification of the aforesaid embodiment.

Further, though the lever support 30 is engaged with the engaging member 35 by the dovetail groove 30A on the bottom side of the lever support 30 and the projection 35A on the engaging member 35 and the projection 35A extends on the entire length of the engaging member 35, other arrangement is possible. For instance, as shown in FIG. 5, a projection 350A extending to the halfway of the length of an engaging member 350 may be used. In the above arrangement, the depth end of the projection 350A is a stopper 360.

According to the above arrangement, since the stopper 360 is formed on the engaging member 350, no independent stopper 36 in the above embodiment is necessary, thereby reducing the number of the components.

Though the block-shaped detachment stopper 36 is provided on the engaging member 35 in the above embodiment to prevent the detachment of the lever support 30 from being detached from the engaging member 35 to the side of the detachment stopper 36, the detachment stopper may be arranged to allow an inverse-push measurement where a great measurement pressure is applied.

Specifically, the engaging member may be arranged as the engaging member 350 having the stopper 360 shown in FIG. 5 and a detachment stopper is fixed on the lever support. Though not shown, the detachment stopper has a hook portion capable of engaging with and releasing from the stopper 360, and a pressing portion is continuously formed on the hook portion through a connecting portion and the detachment stopper has a C-shaped cross section with an opening on the side of the lever support.

The hook off the detachment stopper is flexed to be released from the stopper 360 by pressing the pressing portion to detach the lever support from the engaging member, and, when the hook is engaged with the stopper 360, the detachment of the lever support 30 from the engaging member 35 toward the spindle 25 during the inverse-push measurement where the manual end 20B of the lifting lever 20 is pushed in a direction opposite to the arrow A in FIG. 1 to measure with a great measurement pressure.

Further, though the lever support 30 is engaged with the engaging member 35 by the dovetail groove 30A on the bottom side of the lever support 30 and the projection 35A on the engaging member 35, the projection may be formed on the lever support 30 and the dovetail groove 30A may be formed on the engaging member 35.

Though the dovetail attachment is arranged by the projection 35A of the trapezoidal projection and the groove corresponding thereto, the shape of the groove and the projection may be arranged in any manner. For instance, a combination of a projection of T-shaped cross section or circular cross section and a corresponding groove may be used.

In the displacement measuring instrument 1 of the above embodiment, though a manual end 20B of the lifting lever 20 is disposed on the upper side of the grip of the holder frame 15 and the display that indicates a dimension is disposed on the left side of the holder frame, which is suitable for right-handed people, another arrangement is possible. Specifically, the grip of the holder frame 15 and the manual end 20B of the lifting lever 20 may be disposed on the left side of the display so that the left-handed people can easily use the measuring instrument.

What is claimed is:

1. A displacement measuring instrument, comprising:
    an instrument body;
    a spindle penetrating the instrument body to be slidably supported by the instrument body to be displaced;
    a lifting lever manipulated from the outside to forcibly shifting the spindle;
    a lever support that supports an end of the lifting lever opposite to a drive end of the lifting lever that is in contact with the spindle; and
    an engaging member provided on an outer circumference of the instrument body that detachably and slidably engages and supports the lever support.

2. The displacement measuring instrument according to claim 1,
    wherein the lever support and the engaging member are engaged by a dovetail arrangement including a groove formed on one of the lever support and the engaging member along the outer circumference of the measuring instrument body and a projection formed on the other of the lever support and the engaging member to be engaged with the groove.

3. The displacement measuring instrument according to claim 2,
    wherein a detachment stopper that prevents the lever support from being detached from the engaging member when the lever support is engaged with the engaging member and is slid by a predetermined distance is provided on the engaging member.

4. The displacement measuring instrument according to claim 1,
    wherein the lever support is a synthetic resin molding.

* * * * *